(12) United States Patent
Yomogita

(10) Patent No.: US 9,989,761 B2
(45) Date of Patent: Jun. 5, 2018

(54) TILTING MECHANISM AND DISPLAY DEVICE PROVIDED WITH THE SAME

(71) Applicant: MINEBEA MITSUMI INC., Kitasaku-gun, Nagano (JP)

(72) Inventor: Yasukazu Yomogita, Sagamihara (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days. days.

(21) Appl. No.: 15/288,841

(22) Filed: Oct. 7, 2016

(65) Prior Publication Data

US 2017/0023177 A1 Jan. 26, 2017

Related U.S. Application Data

(63) Continuation of application No. PCT/JP2015/064667, filed on May 15, 2015.

(30) Foreign Application Priority Data

May 16, 2014 (JP) .................................. 2014-102412

(51) Int. Cl.
*G02B 27/01* (2006.01)
*F16M 11/04* (2006.01)
(Continued)

(52) U.S. Cl.
CPC ....... *G02B 27/0149* (2013.01); *F16H 19/001* (2013.01); *F16H 19/04* (2013.01);
(Continued)

(58) Field of Classification Search
CPC ........ G02B 27/0149; G02B 2027/0163; G02B 2027/0154; B60K 2350/106; B60K 2350/405; B60K 11/0235
(Continued)

(56) References Cited

U.S. PATENT DOCUMENTS 5,204,666 A * 4/1993 Aoki ...................... B60K 37/02
340/980
7,184,266 B1 * 2/2007 Chen ................... B60R 11/0235
312/196
(Continued)

FOREIGN PATENT DOCUMENTS

EP 2 479 598 A1 7/2012
JP 2012-150420 A 8/2012
JP 2014-058299 A 4/2014

OTHER PUBLICATIONS

Oct. 2, 2015 International Search Report issued in International Patent Application No. PCT/JP2015/064667.
(Continued)

*Primary Examiner* — Eret C McNichols
(74) *Attorney, Agent, or Firm* — Pearne & Gordon LLP

(57) ABSTRACT

There is provided a tilting mechanism. The tilting mechanism includes a drive source configured to drive a plate, a movement unit connected to the drive source, a conveyance unit configured to be moved linearly by the movement unit, and a plate support member to which the plate is fixed and which is partially engaged with the conveyance unit so that the plate support member is moved by the conveyance unit. The plate is moved linearly by linearly moving the conveyance unit together with the plate support member. Tilting operation of the plate is performed by tilting the plate support member, the tilting of the plate support member being caused by pushing the plate support member by the conveyance unit, which moves linearly in a state that the linear movement of the plate support member is stopped.

13 Claims, 13 Drawing Sheets

(51) Int. Cl.
*F16M 11/10* (2006.01)
*F16M 11/18* (2006.01)
*F16M 13/02* (2006.01)
*G02B 7/00* (2006.01)
*F16H 19/00* (2006.01)
*F16H 19/04* (2006.01)
*F16H 25/20* (2006.01)

(52) U.S. Cl.
CPC ........... *F16H 25/20* (2013.01); *F16M 11/046* (2013.01); *F16M 11/10* (2013.01); *F16M 11/18* (2013.01); *F16M 13/02* (2013.01); *F16M 13/022* (2013.01); *G02B 7/005* (2013.01); *B60K 2350/106* (2013.01); *B60K 2350/405* (2013.01); *G02B 2027/0154* (2013.01); *G02B 2027/0156* (2013.01); *G02B 2027/0163* (2013.01)

(58) Field of Classification Search
USPC .............................................. 359/632; 345/7
See application file for complete search history.

(56) References Cited

U.S. PATENT DOCUMENTS

| | | | | |
|---|---|---|---|---|
| 7,337,450 | B2* | 2/2008 | Sato | B60R 11/0211 720/647 |
| 7,441,738 | B2* | 10/2008 | Kim | B60R 11/0235 248/292.12 |
| 7,869,129 | B2* | 1/2011 | Lebreton | B60K 35/00 345/7 |
| 7,978,414 | B2* | 7/2011 | Potakowskyj | G02B 27/0149 359/630 |
| 8,077,396 | B2* | 12/2011 | Croy | B60K 35/00 359/632 |
| 8,953,247 | B2* | 2/2015 | Rumpf | G02B 7/005 345/7 |
| 9,688,146 | B2* | 6/2017 | Kim | B60K 37/02 |
| 9,817,234 | B2* | 11/2017 | Quiroz de la Mora | G02B 27/0149 |
| 2005/0056734 | A1* | 3/2005 | Lee | B60R 11/0235 248/27.3 |
| 2012/0188650 | A1 | 7/2012 | Rumpf et al. | |
| 2013/0279015 | A1 | 10/2013 | Ishibashi | |
| 2014/0320382 | A1* | 10/2014 | Moussa | G02B 27/0149 345/7 |
| 2014/0340851 | A1* | 11/2014 | Yomogita | H05K 5/0017 361/725 |
| 2014/0368097 | A1* | 12/2014 | Yomogita | G02B 27/0149 312/23 |
| 2015/0116837 | A1* | 4/2015 | Yamada | B60K 35/00 359/632 |
| 2015/0323794 | A1* | 11/2015 | Mikami | G02B 27/0149 359/630 |

OTHER PUBLICATIONS

Oct. 2, 2015 Written Opinion issued in International Patent Application No. PCT/JP2015/064667.
English translation of Chinese Office Action dated Mar. 5, 2018 for corresponding Chinese Application No. 201580025130.3.

\* cited by examiner

TILTING MECHANISM AND DISPLAY DEVICE PROVIDED WITH THE SAME

CROSS REFERENCE TO RELATED APPLICATION

The present application is a Continuation Application of International Application No. PCT/JP2015/064667 claiming conventional priority of Japanese Patent Application No. 2014-102412, filed on May 16, 2014, and titled "TILTING MECHANISM AND DISPLAY DEVICE PROVIDED WITH THE SAME". The disclosures of Japanese Patent Application No. 2014-102412 and International Application No. PCT/JP2015/064667 are incorporated herein by reference in their entirety.

BACKGROUND

The present teaching relates to a tilting mechanism used for a display device such as a head-up display, a pop-up display, and the like and a display device provided with the same.

There are conventionally used head-up displays, pop-up displays, and the like as displays which are equipped in vehicles and on which information is displayed for drivers. The head-up displays are further well known than the pop-up displays. In the head-up display, a picture or image is projected on a windshield or windscreen via a combiner and/or a mirror. In the pop-up display, a picture or image is displayed on a combiner without being projected on the windshield or windscreen.

SUMMARY

Japanese Patent Application Laid-open No. 2012-150420 takes device size reduction and providing the required degree of design freedom as problems to be solved, and in order to solve these problems, Japanese Patent Application Laid-open No. 2012-150420 discloses a head-up display system which is capable of performing the movement and the angle adjustment of a spectrometer (corresponding to a combiner of the present teaching) independently from each other.

According to Japanese Patent Application Laid-open No. 2012-150420, as depicted in FIGS. 1, 3 and 4 thereof, when a guiding pin 1612 of a guiding plate 1611 which guides a cam 141 is in a curve slot 1632 having an arc shape, the constraint between the guiding plate 1611 and a straight slot 1631 is released to rotate the cam 141. In this situation, when an endless gear belt 17 is driven by a motor 18, a drive gear 162 drives (rotates) the cam 141 to adjust the tilt angle of the spectrometer 11.

However, since a spindle 133 and the guiding pin 1612 are not constrained in the head-up display system of Japanese Patent Application Laid-open No. 2012-150420, they are liable to vibrate. Thus, when vibration is transmitted to the device (head-up display system), the cam 141 supported by the spindle 133 vibrates. This vibration is transmitted to the spectrometer 11 guided by the cam 141, which would cause a user to have difficulty in seeing the picture or image displayed on the spectrometer 11.

The vibration isolation (vibration control, vibration reduction) is important especially for the display device used in the vehicle. When the guiding pin 1612 is in the curve slot 1632, the spectrometer 11 and a combiner carrier 15 are supported only by the endless gear belt 17, and thus the force for keeping the spectrometer 11 and the combiner carrier 15 at predetermined positions is not sufficient. As a result, the operation of the display device may be unstable due to, for example, downward shifts of the spectrometer 11 and the combiner carrier 15 caused by their own weights.

The present teaching has been made to solve the foregoing problems, an object of the present teaching is to provide a tilting mechanism, which positions a display unit stably to provide a picture or image on the display unit satisfactorily, and a display device provided with the same.

Another object of the present teaching is to provide a tilting mechanism which performs tilting operation of a display unit stably and which can position the display unit at a desired position reliably, and a display device provided with the same.

In order to achieve the above object, a tilting mechanism according to a first aspect of the present teaching includes a drive source configured to drive a plate; a movement unit connected to the drive source; a conveyance unit configured to be moved linearly by the movement unit; and a plate support member to which the plate is fixed and which is partially engaged with the conveyance unit so that the plate support member is moved by the conveyance unit, wherein the plate is moved linearly by linearly moving the conveyance unit together with the plate support member; and tilting operation of the plate is performed by tilting the plate support member, the tilting of the plate support member being caused by pushing the plate support member by the conveyance unit which moves linearly in a state that the linear movement of the plate support member is stopped.

According to a second aspect of the present teaching, there is provided, a tilting mechanism configured to move a display plate in an up-down direction and to tilt the display plate under a condition that upward movement of the display plate is completed, the tilting mechanism including; a plate support member configured to support the display plate; a first shaft extending in a horizontal direction while being rotatably supported by the plate support member; a conveyance unit which is engaged with the plate support member in a state that the plate support member is rotatable relative to the conveyance unit; and stopper configured to constrain upward movement of the first shaft, wherein the display plate is tilted with the first shaft as a pivot by moving the conveyance unit upwardly in a state that the first shaft is brought into contact with the stopper.

BRIEF DESCRIPTION OF DRAWINGS

FIGS. 9A to 9C are views being taken in the direction of the arrow F in FIG. 1A and each depicting an internal structure of the display device, wherein FIG. 9A depicts a state that the combiner is moving upward; FIG. 9B depicts a state that the upward movement of the combiner is completed and the tilting of the combiner is about to be started; and FIG. 9C depicts a state that the tilting of the combiner is completed.

EMBODIMENTS

Figure 1:
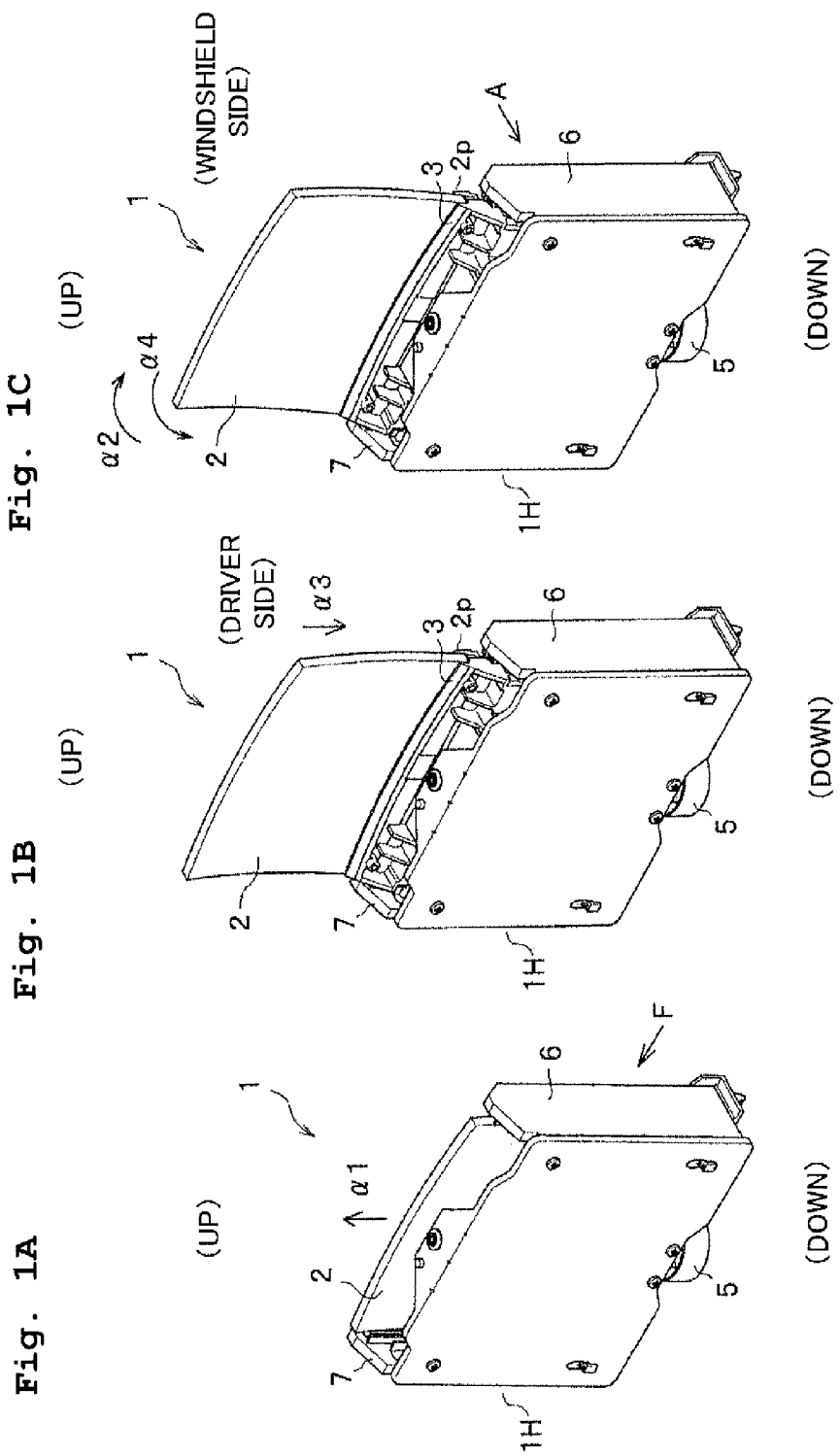
FIG. 1A is a perspective view depicting a state that a display unit (combiner) is stored in a display device related to an embodiment of the present teaching.
FIG. 1B is a perspective view depicting a state immediately before the display unit of the display device starts tilting.
FIG. 1C is a perspective view depicting a state that the display unit of the display device is tilted at a predetermined angle so that a picture or image is displayed thereon.

In the following, an explanation will be given about an embodiment of the present teaching with reference to the accompanying drawings. FIG. 1A is a perspective view depicting a state that a display unit (combiner 2) is stored in a display device 1 related to the embodiment of the present teaching; FIG. 1B is a perspective view depicting a state immediately before the display unit of the display device 1 starts tilting; and FIG. 1C is a perspective view depicting a state that the display unit of the display device 1 is tilted at a predetermined angle so that a picture or image is displayed thereon.

As depicted in FIG. 1C, the display device 1 related to the embodiment of the present teaching is used, for example, by a driver on a vehicle in the following manner. That is, the drive may adjust the combiner 2 to his/her preferred angle so that he/she can visually observe a picture or image projected on the combiner 2.

The display device 1 is applied to the head-up display in which a picture or image is projected on the windshield or windscreen via the combiner and/or the mirror, the pop-up display in which a picture or image is displayed on the combiner without being projected on the windshield or windscreen, and the like.

The display device 1 related to this embodiment will be explained by taking the pop-up display as an example. The pop-up display using the display device 1 is mounted upright in a dashboard or the like of the vehicle. The combiner 2 of the display device 1 slides upward from a storage space (see FIG. 1A) to reach a display position (see FIG. 1B). Then, the combiner 2 performs tilting operation with a first pinion shaft s1 (see FIG. 2) as the center to have an angle which allows the driver to see the combiner 2 easily (see FIG. 1C).

The combiner 2 is stored in a main body 1H when not used, as depicted in FIG. 1A.

When the driver turns on the display device 1 (the power switch is not depicted), the combiner 2 stored in the main body 1H (see FIG. 1A) moves upward in a direction indicated by the arrow α1 in FIG. 1A to arrive at an upward movement stop position (tilt start position) in which the combiner 2 protrudes above as depicted in FIG. 1B.

Then, the driver adjusts a tilt angle of the combiner 2 (see the arrow α2 in FIG. 1C) by use of a tilt adjustment switch (not depicted) to position the combiner 2 at an easily seen place for the driver.

That is, the display device 1 is characterized by the mechanism for moving the combiner 2, on which a picture or image is projected, from the stored position to the display position (see FIG. 1B) and then tilting the combiner 2 at an angle at which the driver can see the picture easily.

Figure 2:
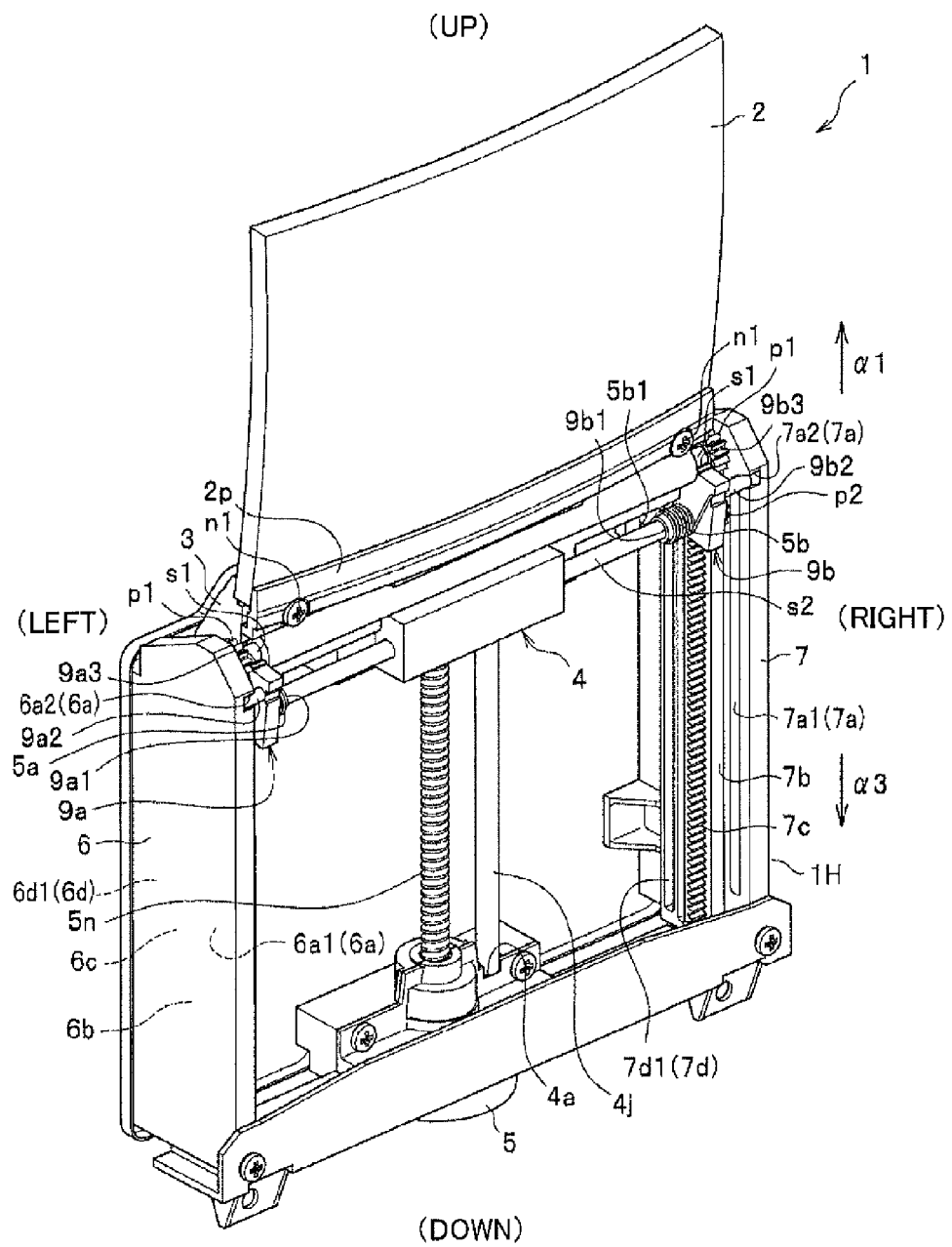
FIG. 2 is a view being taken in the direction of the arrow A in FIG. 1C and depicting a main body of the display device.
Figure 3:
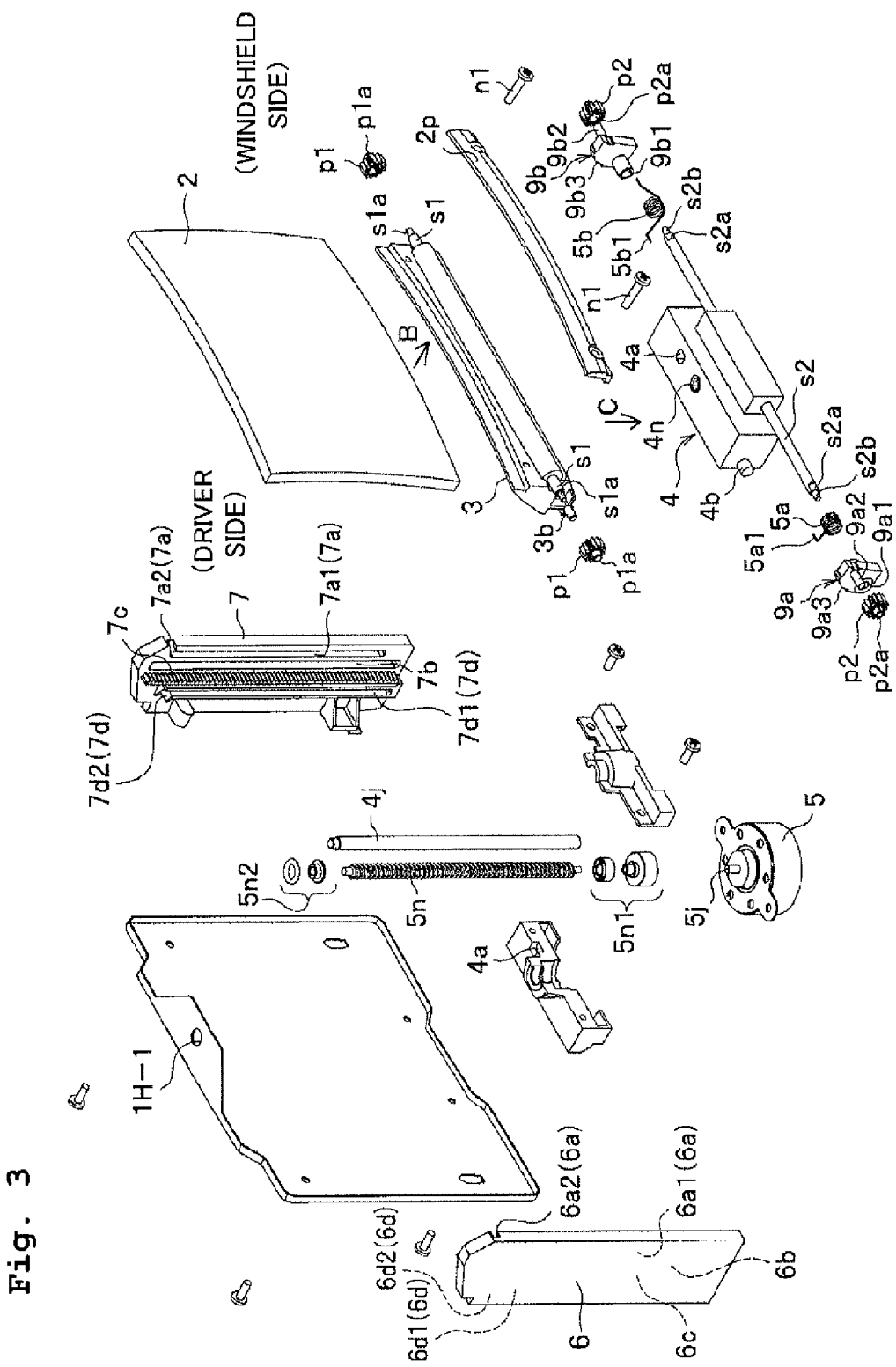
FIG. 3 is an exploded perspective view of main parts of the display device.
Figure 4A:
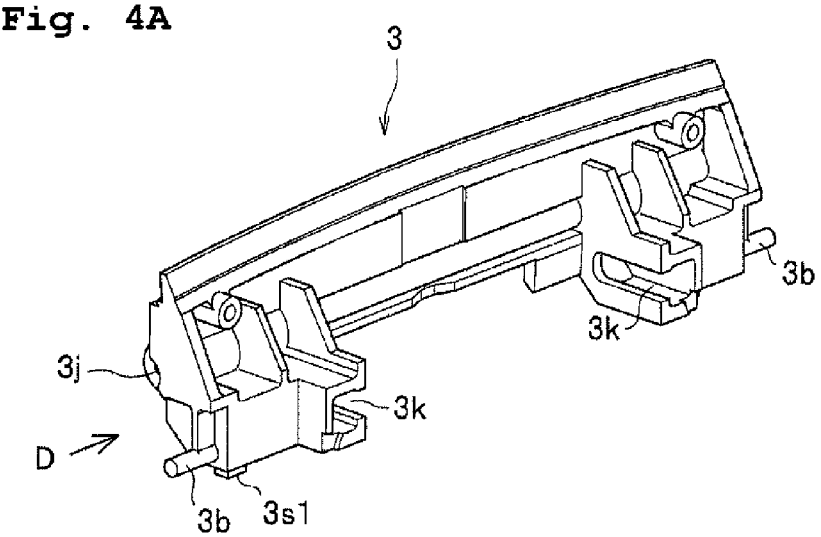
FIG. 4A is a view being taken in the direction of the arrow B in FIG. 3 and depicting a combiner support.
Figure 4B:
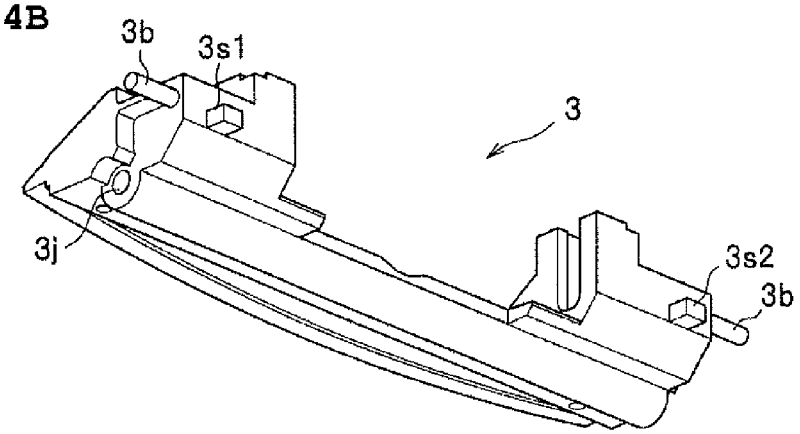
FIG. 4B is a view taken in the direction of the arrow D in FIG. 4A.

FIG. 2 is a view being taken in the direction of the arrow A in FIG. 1C and depicting the inside of the main body 1H of the display device 1. FIG. 3 is an exploded perspective view of main parts of the display device 1. FIG. 4A is a view being taken in the direction of the arrow B in FIG. 3 and depicting a combiner support 1 FIG. 4B is a view taken in the direction of the arrow D in FIG. 4A.

[Combiner 2 and Combiner Support 3]

As depicted in FIG. 2, the combiner 2 is fixed to the combiner support 3 (see FIG. 4) by male screws n1 via a combiner plate 2p. The combiner 2 is moved upward and then tilted as the combiner support 3 is pushed by the carriage 4 and moved upward. The combiner support 3 is biased or urged by a left torsion spring 5a (a torsion spring disposed on the left side of the carriage 4) and a right torsion spring 5b (a torsion spring disposed on the right side of the carriage 4) to approach a left cam 9a (a cam disposed on the left side of the carriage 4) and a right cam 9b (a cam disposed on the right side of the carriage 4). The cams 9a, 9b on left and right sides of the carriage 4 are subjected to elastic force via the torsion springs 5a, 5b on left and right sides of the carriage 4 so as to contact the first pinion shaft s1 which will be described later (see FIG. 7).

As depicted in FIG. 4A, the combiner support 3 includes a pair of cylindrical guide bosses 3b at both side ends of the combiner support 3. The pair of cylindrical guide bosses 3b protrudes outward to guide the movement of the combiner support 3 along a movement path at both sides of the combiner support 3.

The first pinion shaft s1 is rotatably inserted into a circular through hole 3j of the combiner support 3.

The combiner support 3 includes a pair of slots 3k on left and right sides thereof. A pair of guide bosses 4b (see FIG. 3) of the carriage 4 is fitted into the pair of slots 3k. When the carriage 4 moves, the drive force of the carriage 4 is transmitted from the guide bosses 4b to the combiner support 3 via the slots 3k, which results in the up-down movement and the tilting operation of the combiner support 3.

As depicted in FIG. 4B, the combiner support 3 includes spring engagement target portions 3s1, 3s2 at a lower part thereof. The spring engagement target portions 3s1, 3s2 are respectively engaged with engagement portions 5a1, 5b1 of the left and right torsion springs 5a, 5b (see FIG. 8B).

As depicted in FIG. 3, the first pinion shaft s1 has D cuts (not depicted) formed at both ends thereof. The D cut is formed by cutting the first pinion shaft s1 along a plane parallel to the shaft s1 and a plane perpendicular to the shaft s1 and by removing the portion of the first pinion shaft s1 while leaving a portion corresponding to more than half of the entire thickness of the first pinion shaft s1 in the direction perpendicular to the shaft s1.

Small diameter portions s1a, of which diameters are smaller than the diameter of a center part of the first pinion shaft s1, are respectively formed on the outside of the D-cut parts. The small diameter portions s1a provided at both ends of the first pinion shaft s1 are inserted into pinion shaft guide grooves 6b, 7b of first and second guide rails 6, 7 which will be described later. The first pinion shaft s1 and the combiner support 3 are guided by the small diameter portions s1a so as not to deviate (shift) in a front-rear direction (to a driver side or to a windshield side) during the up-down movement of the first pinion shaft s1 together with the combiner support 3.

First pinions p1 are respectively fixed to the D-cut parts at both ends of the first pinion shaft s1. When the first pinion shaft s1 moves in the up-down direction, the first pinions p1 at both ends of the first pinion shaft s1 rotate in a state that the first pinions p1 are engaged with racks 6c, 7c of the first and second guide rails 6, 7. With this, the movements of the left and right ends of the first pinion shaft s1 are synchronized.

Each of the first pinions p1 includes an attachment hole p1a at the center part thereof. The attachment hole p1a is formed in a D-shape, the size of which is slightly larger than that of the D-cut part of the first pinion shaft s1. The D-cut parts of the first pinion shaft s1 are fitted into the attachment holes p1a.

The position where the first pinion p1 on the left side is synchronized with the first pinion p1 on the right side is determined by fixing the first pinions p1 on left and right sides to the D-cut parts at both ends of the first pinion shaft s1 respectively.

[Motor 5, Lead Screw 5n, and Carriage 4]

As depicted in FIG. 3, a motor 5 as a drive source of the carriage 4 is mounted in the main body 1H of the display device 1. A lead screw (screw shaft) 5n having an outer periphery formed with a male screw is fixed to a shaft 5j of the motor 5.

One end of the lead screw 5n is fixed to the shaft 5j of the motor 5 via a first fixation member 5n1. The other end of the lead screw 5n penetrates a support hole 1H-1 and rotatably supported by a second fixation member 5n2.

[Carriage 4]

Figure 5A:
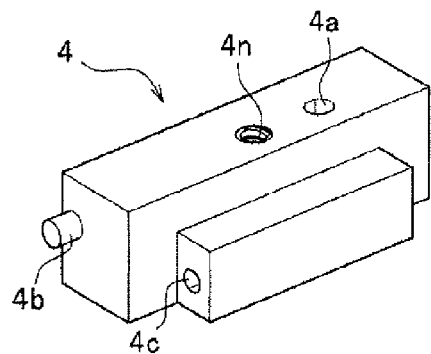
FIG. 5A is a perspective view of a carriage as viewed from obliquely above.
Figure 5B:
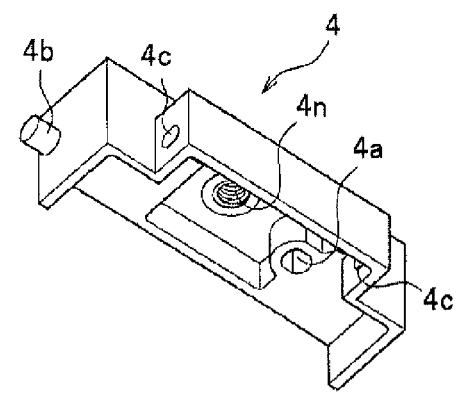
FIG. 5B is a perspective view of the carriage as viewed from obliquely below.

FIG. 5A is a perspective view of the carriage 4 depicted in FIG. 3 as viewed from obliquely above. FIG. 5B is a perspective view of the carriage 4 depicted in FIG. 3 as viewed from obliquely below.

As depicted in FIG. 3, a nut 4n disposed in the carriage 4 is screwed with the lead screw 5n having the outer periphery formed with the male screw. Thus, when the motor 5 is driven, the lead screw 5n is rotated to move the carriage 4 upward (in the direction of the arrow α1 of FIG. 2) and downward (in the direction of the arrow α3 of FIG. 2).

The carriage 4 is moved by the rotation of the lead screw 5n to apply force to the combiner support 3. That is, the carriage 4 makes the combiner 2 perform the movement in the up-down direction (see the arrow α1 of FIG. 1A and the arrow α3 of FIG. 1B) and the tilting operation (see the arrow α2 of FIG. 1C) by applying the force to the combiner support 3.

As depicted in FIGS. 2 and 3, a guide shaft 4j is provided at the central part of the main body 1H. The guide shaft 4j guides the carriage 4 in the up-down direction during the movement of the carriage 4 in the up-down direction. The carriage 4 includes a guide hole 4a (see FIGS. 5A and 5B) penetrating therethrough. The carriage 4 is slidably guided by the guide shaft 4j via the guide hole 4a.

The carriage 4 includes, at both sides thereof, the pair of guide bosses 4b protruding outward. The pair of guide bosses 4b is fitted into the pair of slots 3k of the combiner support 3 to make the combiner support 3 perform the up-down movement and the tilting operation. As described above, the drive force of the carriage 4 is transmitted to the combiner support 3 via the guides bosses 4b fitted into the slots 3k of the combiner support 3.

A second pinion shaft s2 penetrates through guide holes 4c on left and right sides of the carriage 4 in a left-right direction. The second pinion shaft s2 is rotatably or slidably inserted into the carriage 4.

[Second Pinion Shaft s2]

As depicted in FIG. 3, the second pinion shaft s2 has D cuts s2a formed at both ends thereof. The D cut s2a is formed by cutting the second pinion shaft s2 along a plane parallel to the shaft s2 and a plane perpendicular to the shaft s2 and by removing the portion of the second pinion shaft s2 while leaving a portion corresponding to more than half of the entire thickness of the second pinion shaft s2 in the direction perpendicular to the shaft s2.

Small diameter portions s2b, of which diameters are smaller than the diameter of a center part of the second pinion shaft s2, are respectively formed on the outside of the D-cuts s2a. The small diameter portions s2b provided at both ends of the second pinion shaft s2 are inserted into the pinion shaft guide grooves 6b, 7b of the first and second guide rails 6, 7 which will be described later. The second pinion shaft s2 and the carriage 4 are guided by the small diameter portions s2b so as not to deviate (shift) in the front-rear direction (to the driver side or to the windshield side) during the up-down movement of the second pinion shaft s2 together with the carriage 4.

As depicted in FIG. 3, at first, the second pinion shaft s2 is penetrated through the left torsion spring 5a and the right torsion spring 5b. Next, the second pinion shaft s2 is penetrated through shaft attachment holes 9a1, 9b1 (which will be described later) of the left and right cams 9a, 9b, so that the cams 9a, 9h are attached to the second pinion shaft s2.

[Left Cam 9a and Right Cam 9b]

Figure 8A:
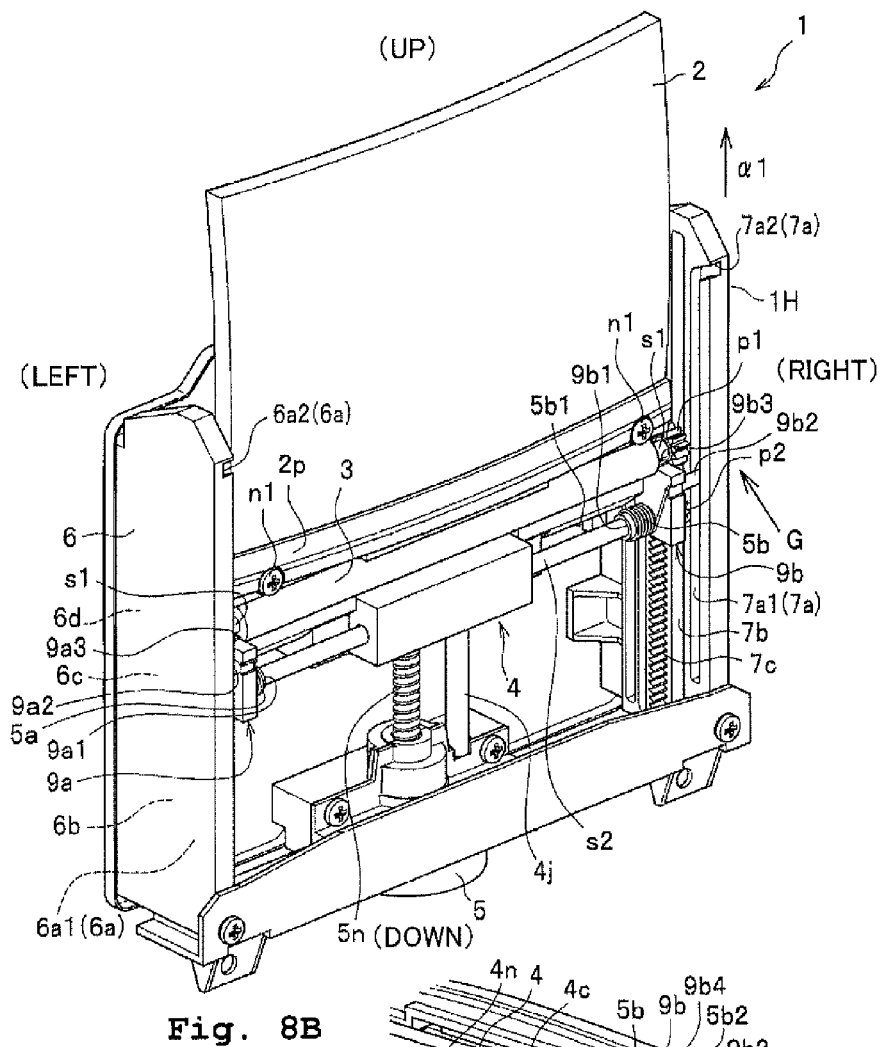
FIG. 8A is a perspective view of an internal structure of the display device in a state that the combiner is moving upward.
Figure 8B:
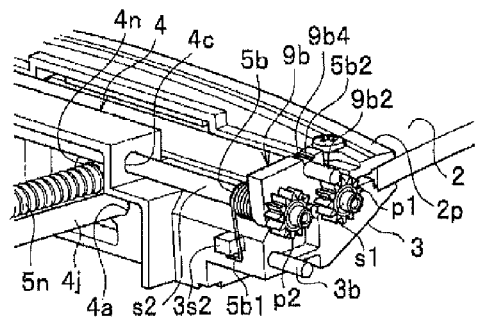
FIG. 8B is an enlarged view taken in the direction of the arrow G in FIG. 8A.

The left and right torsion springs 5a, 5b into which the second pinion shaft s2 is inserted are engaged with the combiner support 3 and the left and right cams 9a, 9b (see FIG. 8B). Thus, as depicted in FIG. 2, the left and right torsion springs 5a, 5b urge or bias the combiner support 3 and the left and right cams 9a, 9b, so that the first pinion shaft s1 inserted into the combiner support 3 is brought in contact under pressure with shaft guide surfaces 9a3 and 9b3 of the left and right cams 9a, 9b.

In this structure, the first pinion shaft s1 supporting the combiner 2 is supported in a state of being brought in contact under pressure with the left and right cams 9a, 9b all the time. This stabilizes the first pinion shaft s1 and prevent the deviation of the combiner 2. Thus, the combiner 2 can move smoothly and stably with the deviation thereof being prevented.

Figure 6A:
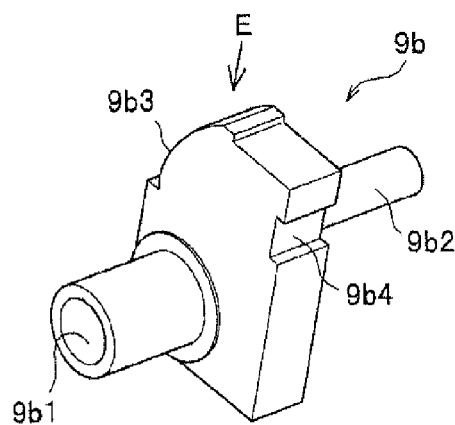
FIG. 6A is a perspective view of a cam depicted in FIG. 2.
Figure 6B:
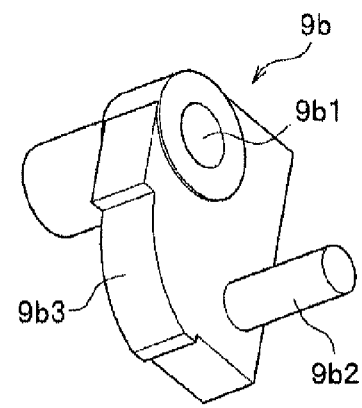
FIG. 6B is a view taken in the direction of the arrow E in FIG. 6A.

The left cam 9a and the right cam 9b have configurations which are mirror symmetric with respect to a plane orthogonal to the left-right direction. Therefore, only the right cam 9b will be explained, and any explanation of the left cam 9a will be omitted. FIG. 6A is a perspective view of the right cam 9b depicted in FIG. 2. FIG. 6B is a view taken in the direction of the arrow E in FIG. 6A.

The right cam 9b includes the shaft attachment hole 9b1 penetrating therethrough. The second pinion shaft s2 rotatably penetrates the shaft attachment hole 9b1. The right cam 9b further includes a cam guide boss 9b2 to be fitted into a cam guide groove 7a of the second guide rail 7. The cam guide boss 9b2 is cylindrical and protrudes outward. The cam guide boss 9b2 is fitted into the cam guide groove 7a so as to guide the movement (path) of the right cam 9b during the up-down movement of the right cam 9b together with the second pinion shaft s2.

The right cam 9b has a concave-shaped spring engagement portion 9b4, which is to be engaged with an engagement portion 5b2 of the right torsion spring 5b. Further, the cam 9b includes the shaft guide surface 9b3 formed in a shape having a curvature (curved surface shape). The shaft guide surface 9b3 contacts the first pinion shaft s1 by the elastic force of the right torsion spring 5b to prevent the deviation of the first pinion shaft s1.

As described above, the shaft guide surfaces 9a3, 9b3 of the left and right cams 9a, 9b are brought in contact under pressure with the first pinion shaft s1. Thus, the first pinion shaft s1 is supported by the shaft guide surfaces 9a3, 9b3 of the left and right cams 9a, 9b, which prevents the deviation and/or vibration of the combiner 2 supported by the first pinion shaft s1 and stabilizes the combiner 2.

The first pinion shaft s1 slides on the shaft guide surfaces 9a3, 9b3 of the left and right earns 9a, 9b during the up-down movement and the tilting operation of the combiner 2.

The curvature of the shaft guide surface 9b3 may be a circle curvature or any other curvature than the circle. That is, the cross section of the shaft guide surface 9b3 by a plane orthogonal to the left-right direction may be an arc of a circle or any other curve.

[Second Pinion p2]

Second pinions p2 are fixed to respective D-cuts s2a at both ends of the second pinion shaft s2. When the second pinion shaft s2 moves in the up-down direction, the second pinions p2 at both ends of the second pinion shaft s2 rotate in a state that the second pinions p2 are engaged with the racks 6c, 7c of the first and second guide rails 6, 7. With this, the movements of the left and right ends of the second pinion shaft s2 are synchronized.

As depicted in FIG. 3, each of the second pinions p2 includes an attachment hole p2a at the center part thereof. The attachment hole p2a is formed in a D-shape, the size of which is slightly larger than that of the D-cut s2a of the second pinion shaft s2. The D-cuts s2a of the second pinion shaft s2 are fitted into the attachment holes p2a.

The position where the second pinion p2 on the left side is synchronized with the second pinion p2 on the right side is determined by fixing the second pinions p2 on left and right sides to the D-cuts s2a at both ends of the second pinion shaft s2.

[First and Second Guide Rails 6, 7]

As depicted in FIGS. 2 and 3, the first and second guide rails 6, 7 are provided on left and right sides of the carriage 4 at both sides of the main body 1H. The first and second guide rails 6, 7 guide the combiner support 3, the first and second pinion shafts s1, s2, and the left and right cams 9a, 9b in the up-down direction in a state that their deviation in the front-rear direction (the direction extending between the back side of the page of FIG. 2 and the front side of the page of FIG. 2) are prevented.

The first guide rail 6 disposed on the left side and the second guide rail 7 disposed on the right side have configurations which are mirror symmetric with respect to the plane orthogonal to the left-right direction. Thus, only the second guide rail 7 will be explained, and any explanation of the first guide rail 6 will be omitted.

The second guide rail 7 has the cam guide groove 7a which is formed as a concave groove for the cam and which guides the movement of the right cam 9b along a movement path.

The cam guide groove 7a includes a first cam guide groove 7a1 and a second cam guide groove 7a2. The first cam guide groove 7a1 is formed to extend linearly in the up-down direction. The second cam guide groove 7a2 is formed to be continued from the upper end of the first cam guide groove 7a1 and to extend linearly while being inclined toward the windshield or windscreen.

The pinion shaft guide groove 7b is formed adjacent to the first and second cam guide grooves 7a1, 7a2 to extend linearly in the up-down direction. The pinion shaft guide groove 7b is a concave groove for guiding the first and second pinion shafts s1, s2 linearly in the up-down direction.

The rack 7c is formed adjacent to or along the pinion shaft guide groove 7b to extend linearly in the up-down direction.

A concave-shaped support guide groove 7d is formed adjacent to or along the rack 7c. The guide boss 3b of the combiner support 3 fits into the support guide groove 7d. The support guide groove 7d has an up-down movement guide groove 7d1 and a tilt guide groove 7d2. The up-down movement guide groove 7d1 extends linearly in the up-down direction to guide the guide boss 3b during the movement of the combiner 2 in the up-down direction. The tilt guide groove 7d2 guides the guide boss 3b during the tilting operation of the combiner 2.

The first guide rail 6 and the second guide rail 7 have configurations which are mirror symmetric with respect to the plane orthogonal to the left-right direction. Thus, the first guide rail 6 includes a cam guide groove 6a, a pinion shaft guide groove 6b, the rack 6c, and a support guide groove 6d those of which are formed similarly to the cam guide groove 7a, the pinion shaft guide groove 7b, the rack 7c, and the support guide groove 7d of the second guide rail 7, respectively.

<Outline of Structure for Driving Combiner 2>

The structure for driving the combiner 2 is summarized as follows. That is, in the display device 1 of the embodiment, main members for moving the combiner 2 include the combiner support 3, the carriage 4, the left cam 9a, and the right cam 9b. The combiner 2 is fixed directly to the combiner support 3.

The carriage 4 is a conveyance member which pushes and pulls the combiner support 3 so as to allow the combiner 2 to perform the up-down movement and the tilting operation.

The left cam 9a and the right cam 9b are brought in contact under pressure with the first pinion shaft s1 inserted into the combiner support 3, thereby supporting the first pinion shaft s1 (and therefore combiner 2) stably.

As depicted in FIG. 2, when the motor 5 is driven to rotate the lead screw 5n, the carriage 4 moves in the up-down direction (directions indicated by the arrows α1, α3 of FIG. 2). Only the carriage 4 is directly driven by the lead screw 5n.

The guide shaft 4j penetrates through the guide hole 4a of the carriage 4 to guide the carriage 4 in the up-down direction without tilting.

Further, the second pinion shaft s2, to which the second pinions p2 are to be fixed at both ends thereof respectively, is inserted into the carriage 4. The second pinions p2 rotate in a state that the second pinions p2 are engaged with the racks 6c, 7c of the first and second guide rails 6, 7. The synchronization between the movement of the left end of the second pinion shaft s2 and the movement of the right end of the second pinion shaft s2 is made by making the second pinions p2 at both ends of the second pinion shaft s2 rotate in a state that the second pinions p2 are engaged with the racks 6c, 7c of the first and second guide rails 6, 7. The small diameter portions s2b at both ends of the second pinion shaft s2 are respectively fitted into the pinion shaft guide grooves 6b, 7b of the first and second guide rails 6, 7 to be guided in the up-down direction.

The second pinion shaft s2 penetrates through the left cam 9a and the right cam 9b. The left and right cams 9a, 9b are driven by the movement of the second pinion shaft s2. The movement of the left and right cams 9a, 9b are guided by the cam guide bosses 9a2, 9b2, which are respectively fitted into the cam guide grooves 6a, 7a of the first and second guide rails 6, 7.

The left cam 9a and the right cam 9b are biased and pressed against the first pinion shaft s1 by the left torsion spring 5a and the right torsion spring 5b. Thus, the first pinion shaft s1 moves while being supported by the left cam 9a and the right cam 9b.

The first pinions p1 on left and right sides are fixed to both ends of the first pinion shaft s1. The synchronization between the movement of the left end of the first pinion shaft s1 and the movement of the right end of the first pinion shaft s1 is made by making the first pinions p1 rotate in a state that the first pinions p1 are engaged with the racks 6c, 7c of the first and second guide rails 6, 7.

The first pinion shaft s1 is inserted into the combiner support 3. The pair of guide bosses 4b of the carriage 4 is fitted into the pair of slots 3k (see FIG. 4A) of the combiner support 3 so that the pair of slots 3k is pushed by the movement of the pair of guide bosses 4b of the carriage 4. Accordingly, the up-down movement and the tilting operation of the combiner support 3 is caused by the drive force of the carriage 4.

Here, the left cam 9a and the right cam 9b are urged or biased against the combiner support 3 by the left torsion spring 5a and the right torsion spring 5b so as to approach the combiner support 3. This brings the left and right cams 9a, 9b into contact under pressure with the first pinion shaft s1 inserted into the combiner support 3.

Accordingly, the first pinion shaft s1 inserted into the combiner support 3 is constrained by the left cam 9a and the right cam 9b so as not to suffer from deviation and/or vibration. This allows the combiner 2, which is integrally fixed to the combiner support 3, to stably move in the up-down direction (see FIGS. 1A and 1B) and to stably perform the tilting operation (see FIG. 1C) with the first pinion shaft s1 as the center.

[Process from Unused State of the Combiner 2 to used State]

Subsequently, an explanation will be made about the process from an unused state of the combiner 2 to a used state of the combiner 2, in other words, the process including the upward movement and the tilting operation of the combiner 2.

Figure 7:
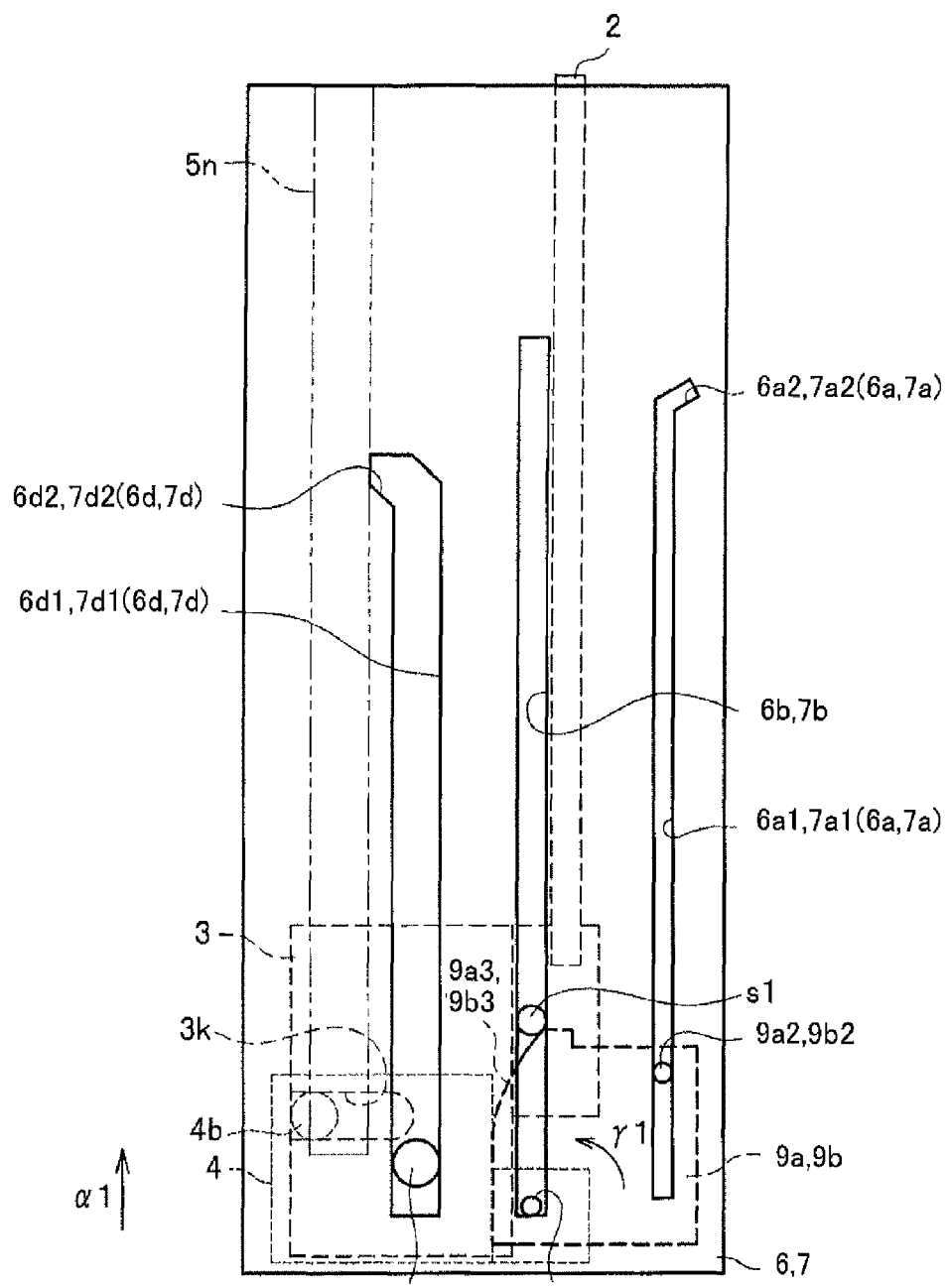
FIG. 7 is a view being taken in the direction of the arrow F in FIG. 1A and depicting an internal structure of the display device in a state that the combiner is stored in the main body, the internal structure including the carriage, the combiner support, and the cams.

FIG. 7 is a view being taken in the direction of the arrow F in FIG. 1A and depicting an internal structure of the display device 1 in a state that the combiner 2 is stored in the main body, the internal structure including the carriage 4, the combiner support 3, the left cam 9a, and the right cam 9b. In FIG. 7, the combiner 2, the carriage 4, the combiner support 3, the left cam 9a, the right cam 9b, and the like are depicted simply or schematically. Further, in FIG. 7, the first and second guide rails 6, 7 positioned on the nearest and farthest sides respectively; the grooves provided for the first and second guide rails 6, 7 such as the cam guide grooves 6a, 7a; and the cam guide bosses 9a2, 9b2 etc. to be fitted into the cam guide grooves 6a, 7a, etc. are depicted by solid lines. The combiner 2, the combiner support 3, the carriage 4, the left cam 9a, and the right cam 9b those of which are positioned between the first and the second guides rails 6, 7 are depicted by dashed lines. The solid lines and dashed lines are used in a similar manner to the above in FIG. 9A, FIG. 9B, FIG. 9C, FIG. 10, FIG. 11, and FIG. 12.

The combiner 2 is in the main body 1H when the combiner 2 is in the unused state. The pair of guide bosses 4b (see FIG. 3) of the carriage 4 is fitted into the pair of slots 3k (see FIG. 4A) of the combiner support 3 supporting the combiner 2. Meanwhile, the guide bosses 3b (see FIG. 4B) of the combiner support 3 are fitted into the cam guide grooves 6d, 7d of the first and second guide rails 6, 7.

The first and second pinion shafts s1, s2 are fitted into the pinion shaft guide grooves 6b, 7b.

The shaft guide surface 9a3 of the left cam 9a and the shaft guide surface 9b3 of the right cam 9b are brought in contact under pressure with the first pinion shaft s1 by the left torsion spring 5a and the right torsion spring 5b, respectively (see the arrow γ1 of FIG. 7). The cam guide boss 9a2 of the left cam 9a and the cam guide boss 9b2 of the right cam 9b are fitted into the cam guide grooves 6a, 7a, respectively.

At the start of using the combiner 2, the motor 5 is driven first. This rotates the lead screw 5n to move the carriage 4, which has the nut 4n engaged with the lead screw 5n, upward. Since the pair of guide bosses 4b (see FIG. 5A) of the carriage 4 is fitted into the pair of slots 3k (see FIG. 4A) of the combiner support 3, the upward movement of the carriage 4 (see the arrow α1 of FIG. 7) causes the pair of guide bosses 4b to push the pair of slots 3k upward, thereby moving the combiner support 3 upward.

Figure 9B:
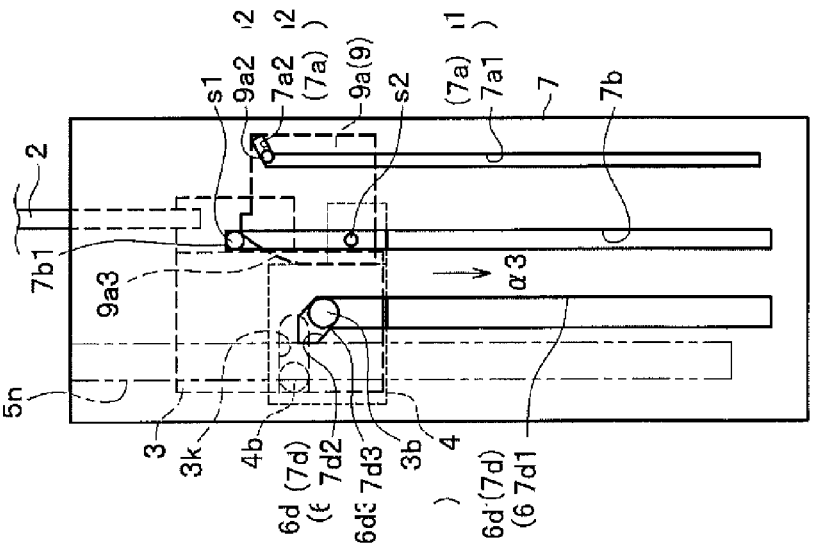
Figure 9A:
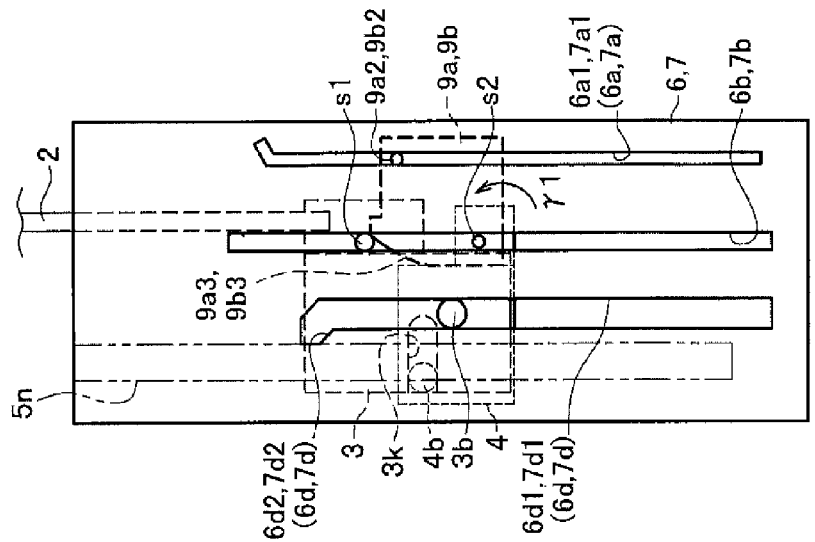
Figure 9C:
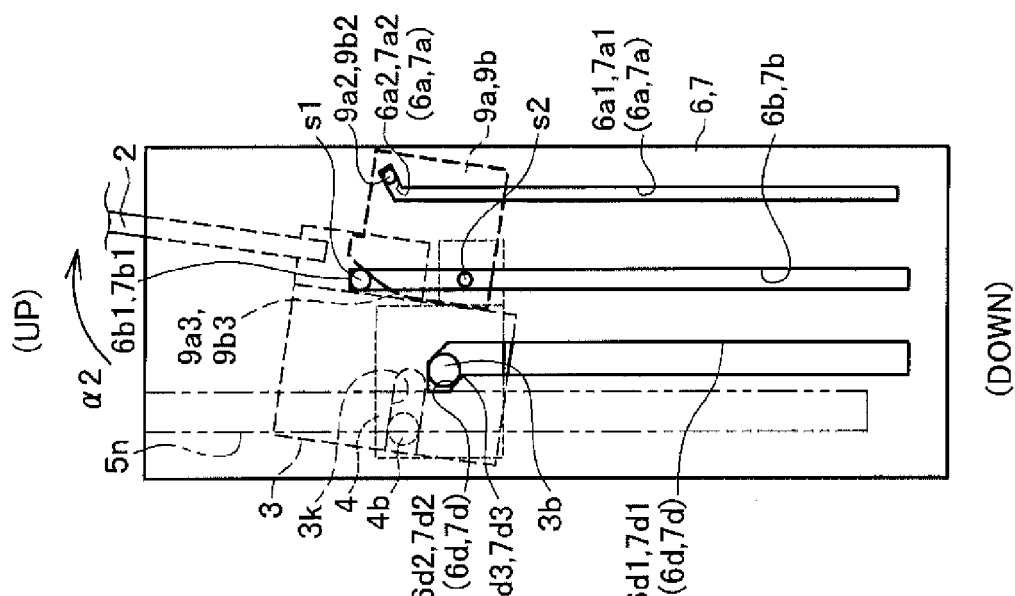

FIG. 8A is a perspective view of an internal structure of the display device 1 in a state that the combiner 2 is moving upward. FIG. 8B is an enlarged view taken in the direction of the arrow G in FIG. 8A. FIGS. 9A to 9C are views being taken in the direction of the arrow F in FIG. 1A and each depicting an internal structure of the display device 1, wherein FIG. 9A depicts a state that the combiner 2 is moving upward; FIG. 9B depicts a state that the upward movement of the combiner 2 is completed and the tilting of the combiner 2 is started; and FIG. 9C depicts a state that the tilting of the combiner 2 is completed.

The second pinion shaft s2 to be inserted into the carriage 4 penetrates through the left cam 9a and the right cam 9b. Thus, the left cam 9a and the right cam 9b move upward together with the carriage 4. In this situation, the left cam 9a and the right cam 9b through which the second pinion shaft s2 penetrates are brought in contact under pressure with the first pinion shaft s1 by the left torsion spring 5a and the right torsion spring 5b. Thus, the first pinion shaft s1 is supported by the shaft guide surface 9a3 of the left cam 9a and the shaft guide surface 9b3 of the right cam 9b, which allows the first pinion shaft s1 to stably move upward without suffering from deviation or vibration. Accordingly, the combiner 2 fixed to the combiner support 3 can stably move upward as depicted in FIG. 9A and as indicated by the arrow α1 of FIG. 8A.

During the movement of the first pinion shaft s1 in the up-down direction, the synchronization between the movement of the left end of the first pinion shaft s1 and the movement of the right end of the first pinion shaft s1 is made by making the first pinions p1 attached to both ends of the first pinion shaft s1 rotate in a state that the first pinions p1 are engaged with the racks 6c, 7c (see FIGS. 8A and 8B) of the first and second guide rails 6, 7.

Similarly, during the movement of the second pinion shaft s2 in the up-down direction, the synchronization between the movement of the left end of the second pinion shaft s2 and the movement of the right end of the second pinion shaft s2 is made by making the second pinions p2 attached to both ends of the second pinion shaft s2 rotate in a state that the second pinions p2, are engaged with the racks 6c, 7c of the first and second guide rails 6, 7.

As depicted in FIG. 9A, the guide bosses 4b of the carriage 4 are fitted into the slots 3k of the combiner support 3. Thus, the slots 3k are pushed to move upward by the upward movement of the guide bosses 4b, which causes the upward movement of the combiner support 3 together with the combiner 2.

The second pinion shaft s2 inserted into the carriage 4 penetrates through the left cam 9a and the right cam 9b. Thus, the left cam 9a and the right cam 9b move upward together with the carriage 4. The shaft guide surface 9a3 of the left cam 9a and the shaft guide surface 9b3 of the right cam 9b are brought in contact under pressure with the first pinion shaft s1 by the left torsion spring 5a and the right torsion spring 5b, and thus the first pinion shaft s1 inserted into the combiner support 3 moves upward while being constrained (supported) by the shaft guide surface 9a3 of the left cam 9a and the shaft guide surface 9b3 of the right cam 9b. That is, the first pinion shaft s1 slides on the shaft guide surfaces 9a3, 9b3 of the left and right cams 9a, 9b during the upward movement of the first pinion shaft s1.

During the movement of the first pinion shaft s1 in the up-down direction, the synchronization between the movement of the left end of the first pinion shaft s1 and the movement of the right end of the first pinion shaft s1 is made by making the first pinions p1 attached to both ends of the first pinion shaft s1 move in a state that the first pinions p1 are engaged with the racks 6c, 7c of the first and second guide rails 6, 7, respectively.

Similarly, during the movement of the second pinion shaft s2 in the up-down direction, the synchronization between the movement of the left end of the second pinion shaft s2 and the movement of the right end of the second pinion shaft s2 is made by making the second pinions p2 attached to both ends of the second pinion shaft s2 move in a state that the second pinions p2 are engaged with the racks 6c, 7c of the first and second guide rails 6, 7, respectively.

Figure 10:
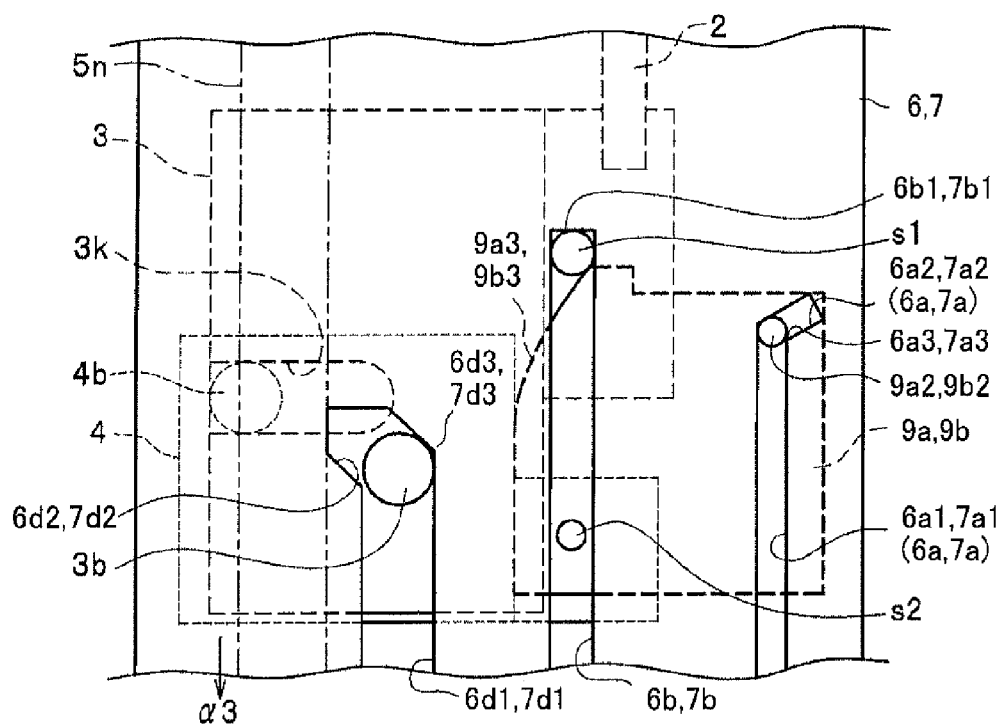
FIG. 10 is an enlarged view being taken in the direction of the arrow F in FIG. 1A and depicting a structure, including the combiner support, the carriage, the cams, and the like, in a state that the upward movement of the combiner is completed.

FIG. 10 is an enlarged view being taken in the direction of the arrow F in FIG. 1A and depicting a structure, including the combiner support 3, the carriage 4, the left cam 9a, the right cam 9b, and the like, in a state that the upward movement of the combiner 2 is completed (i.e. in a state that the tilting operation is about to be started).

As depicted in FIG. 9B and FIG. 10, when the first pinion shaft s1 inserted into the combiner support 3 reaches the upper end edges (upper ends) 6b1, 7b1 of the pinion shaft guide grooves 6b, 7b, the upward movement of the first pinion shaft s1 stops and at the same time the straight upward movement of the combiner support 3 through which the first pinion shaft s1 penetrates stops as well.

Further, when the first pinion shaft s1 reaches the upper end edges 6b1, 7b1 of the pinion shaft guide grooves 6b, 7b, the guide bosses 3b of the combiner support 3 respectively reach the bent parts 6d3, 7d3 of the support guide grooves 6d, 7d of the first and second guide rails 6, 7 and at the same time the cam guide bosses 9a2, 9b2 of the left and right cams 9a, 9b respectively reach the bent parts 6a3, 7a3 of the cam guide grooves 6a, 7a.

Figure 11:
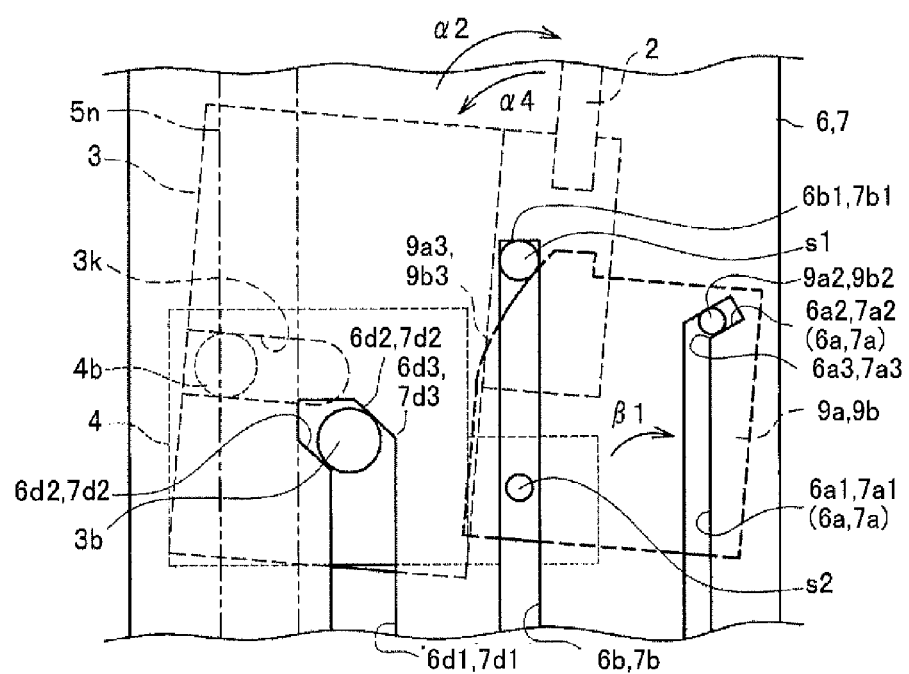
FIG. 11 is an enlarged view being taken in the direction of the arrow F in FIG. 1A and depicting a structure, including the combiner support, the carriage, the cams, and the like, in a state that the combiner is being tilted.

FIG. 11 is an enlarged view being taken in the direction of the arrow F in FIG. 1A and depicting a structure, including the combiner support 3, the carriage 4, the left cam 9a, the right cam 9b, and the like, during the tilt operation of the combiner 2. When the lead screw 5n in a state depicted in FIG. 10 further rotates, the first pinion shaft s1 keeps a stop state in which the first pinion shaft s1 is brought into contact with the upper end edges 6b1, 7b1 of the pinion shaft guide grooves 6b, 7b, as depicted in FIG. 11. In this situation, the first pinion shaft s1 is subjected to upward force at both ends in the left-right direction by the shaft guide surfaces 9a3, 9b3 of the left and right cams 9a, 9b. Thus, the first pinion shaft s1 is stably supported by the left and right cams 9a, 9b at the stop position.

On the other hand, the carriage 4 continues to move further upward, so that the pair of guide bosses 4b of the carriage 4 pushes the pair of the slots 3k of the combiner support 3 upward. Thus, the pair of guide bosses 3b of the combiner support 3 moves obliquely upward in the tilt guide grooves 6d2, 7d2 of the first and second guide rails 6, 7.

Accordingly, the combiner support 3 through which the first pinion shaft s1 penetrates tilts in the direction indicated by the arrow α2 in FIG. 9C and FIG. 11 with the first pinion shaft s1 as the center, and the combiner 2 fixed to the combiner support 3 tilts, integrally with the combiner support 3, in the direction indicated by the arrow α2 in FIG. 9C and FIG. 11. In this situation, the left cam 9a and the right cam 9b are subjected to upward force by the second pinion shaft s2, which moves the cam guide bosses 9a2, 9b2 in the second cam guide grooves 6a2, 7a2 linearly formed in the first and second guide rails 6, 7. Accordingly, the left cam 9a and the right cam 9b rotate in the direction indicated by the arrow 131 in FIG. 11. During this rotational movement, the first pinion shaft s1 slides on the shaft guide surfaces 9a3, 9b3 of the left and right cams 9a, 9b so that the first pinion shaft s1 remain supported by the shaft guide surfaces 9a3, 9b3 of the left and right cams 9a, 9b.

As described above, the first pinon shaft s1, which functions as the rotation center of the combiner 2 and the combiner support 3, is supported by the shaft guide surfaces 9a3, 9b3 of the left and right cams 9a, 9b in a state of being brought into contact with the upper end edges 6b1, 7b1 of the pinion shaft guide grooves 6b, 7b during the tilting operation of the combiner 2. Thus, the combiner 2 and the combiner support 3 can perform stable tilting operation with the first pinion shaft s1 as the rotation center.

Figure 12:
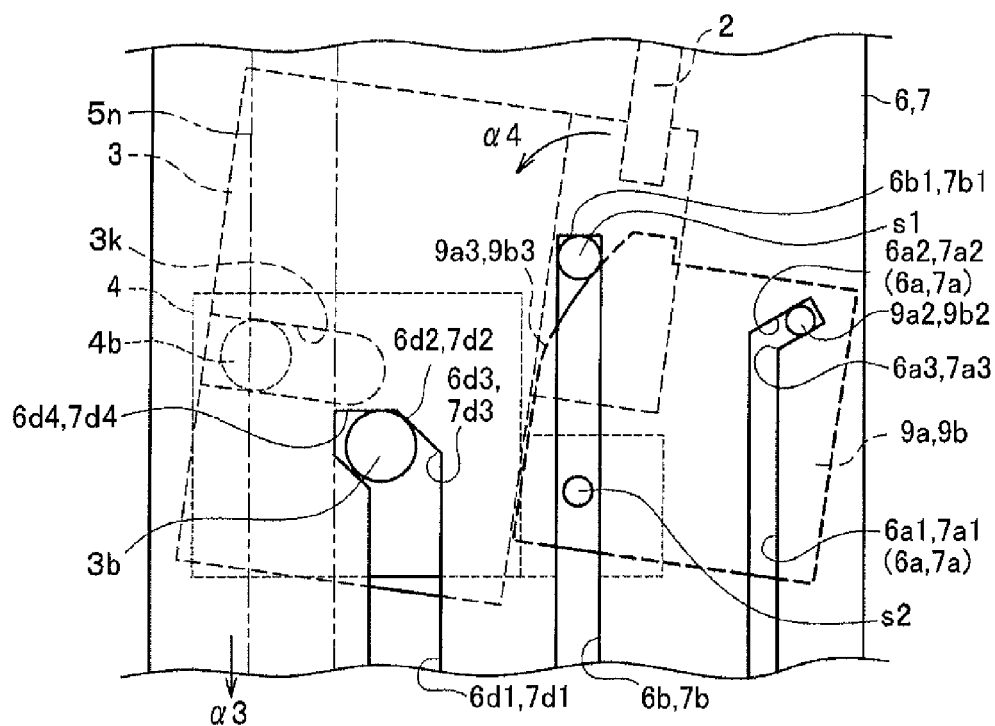
FIG. 12 is an enlarged view being taken in the direction of the arrow F in FIG. 1A and depicting a structure, including the combiner support, the carriage, the cams, and the like, in a state that the tilting operation of the combiner is completed.

FIG. 12 is an enlarged view being taken in the direction of the arrow F in FIG. 1A and depicting a structure, including the combiner support 3, the carriage 4, the left cam 9a, the right cam 9b, and the like, in a state that the tilting operation of the combiner 2 is completed. When the carriage 4 in a state depicted in FIG. 11 moves further upward, the guide bosses 3b of the combiner support 3 are brought into contact with the tilting-guide stop grooves 6d4, 7d4 of the first and second guide rails 6, 7 as depicted in FIG. 12 to stop the tilting operation of the combiner 2 and the combiner support 3. Accordingly, the combiner 2 is tilted as depicted in FIG. 2.

In the above explanation, the case, in which the combiner 2 is tilted to finally reach the tilt end position depicted in FIG. 12, is exemplified. The tilt angle of the combiner 2, however, may be any angle desired by a user provided that the angle corresponds to a movable range of the combiner 2 as depicted in FIGS. 10 to 12.

[Process from Used State of Combiner 2 to Unused State]

When the user pushes a switch (not depicted) to move the combiner 2 from the used state as depicted in FIG. 12 to the unused state, the combiner 2 moves, in a reverse order (i.e. in order of FIG. 12, FIG. 11, FIG. 10, FIG. 9C, FIG. 9B, and FIG. 9A) of the operation for making the combiner 2 the used state, to return to the stored state depicted in FIG. 1A.

Specifically, when the user pushes the switch (not depicted) to move the combiner 2 in a state of FIG. 12 or FIG. 9C to the unused state, the lead screw 5n is reversely rotated.

Then, the carriage 4 is moved in the direction indicated by the arrow α3 of FIG. 12 since the lead screw 5n is screwed into the nut 4n. When the carriage 4 moves in the direction indicated by the arrow α3, the pair of the guide bosses 4b of the carriage 4 pushes the pair of slots 3k of the combiner support 3 downward to move the combiner 2 and the combiner support 3 in the direction indicated by the arrow α4. Accordingly, the combiner 2 and the combiner support 3 return to the state before tilting.

Further, when the carriage 4 moves in the direction indicated by the arrow α3, the second pinion shaft s2 inserted into the carriage 4 moves downward (the direction indicated by the arrow α3).

Since the second pinion shaft s2 penetrates through the left cam 9a and the right cam 9b, the left and right cams 9a, 9b also move downward (the direction indicated by the arrow α3) together with the second pinion shaft s2. In this situation, the first pinion shaft s1 is biased or urged by the left and right torsion springs 5a, 5b to be brought into contact with the left and right cams 9a, 9b so that the first pinion shaft s1 is constrained by the upper end edges 6b1, 7b1 of the pinion shaft guide grooves 6b, 7b and the shaft guide surfaces 9a3, 9b3.

By continuing the reverse rotation of the lead screw 5n in the above state, the combiner 2 in the state of being tilted moves in the direction indicated by the arrow α4 of FIG. 11 to return to the state before the tilting operation is started as depicted in FIG. 10 and FIG. 9B.

By further continuing the reverse rotation of the lead screw 5n, the carriage 4 is moved in the direction indicated by the arrow α3 in FIG. 10 and FIG. 9B (downward direction) since the lead screw 5n is screwed into the nut 4n of the carriage 4. In this situation, the pair of the guide bosses 4b of the carriage 4 pushes the pair of slots 3k of the combiner support 3 downward to move the combiner 2 and the combiner support 3 in the direction indicated by the arrow α3 in FIG. 10 and FIG. 9B (downward direction).

At the same time, the second pinion shaft s2 inserted into the carriage 4 also moves downward (the direction indicated by the arrow α3 in FIG. 10 and FIG. 9B). Then, the left cam 9a and the right cam 9b through which the second pinion shaft s2 penetrates also move in the direction indicated by the arrow α3 in FIG. 10 and FIG. 9B (downward), so that the first pinion shaft s1 urged or biased to be brought into contact with the left and right cams 9a, 9b moves downward (the direction indicated by the arrow α3 in FIG. 10 and FIG. 9B) while being brought in contact under pressure with the left and right cams 9a, 9h.

By continuing the reverse rotation of the lead screw 5n much further, the combiner 2 returns to the initial position where the combiner 2 is stored in the display device 1 as depicted in FIG. 9A.

The characteristics of this embodiment are summarized in the following paragraphs (1) to (6).

(1) During the vertical movement of the combiner 2 (see FIGS. 9A and 9B), the combiner support 3 through which the first pinion shaft s1 penetrates moves integrally with the carriage 4 by engaging the pair of guide bosses 4b of the carriage 4 with the pair of slots 3k of the carriage 3 and bringing the first pinion shaft s1 into contact under pressure with the left cam 9a and the right cam 9b moving integrally with the carriage 4. After the completion of the vertical movement of the combiner 2, the upward movement of the combiner support 3 stops, but the upward movement of the carriage 4 is continued.

(2) During the tilting operation of the combiner 2, the pair of guide bosses 4b of the carriage 4 of which upward movement is continued pushes one end (the pair of slots 3k) of the combiner support 3. This results in the tilting of the combiner 2 with the first pinion shaft s1 as the center.

Therefore, according to the display device 1 related to this embodiment, the vertical movement and the tilting operation of the combiner 2 can be performed by using the same drive source, and the vertical movement and the tilting operation can be performed independently from each other.

(3) The tilt angle of the combiner 2 can be defined depending on the movement amount of the carriage 4.

(4) During the tilting operation of the combiner 2, the first pinion shaft s1 functioning as the rotation center (fulcrum) of tilting operation of the combiner 2 is stably held in place by being supported by the left and right cams 9a, 9b from below. This allows the combiner 2 to perform the tilting operation stably, thereby making it possible to prevent the vibration of the combiner 2 which would be otherwise caused by the vibration of parts or units in which the display device 1 is provided.

(5) The first pinion shaft s1 inserted into the combiner support 3 to which the combiner 2 is fixed is supported by the left and right cams 9a, 9b from below all the time. Thus, the combiner 2 can move in a state that the vibration of the combiner 2 caused by the vibration of parts or units in which the display device 1 is provided is prevented.

(6) The lead screw 5n and the nut 4n are used as a movement means or mechanism for moving the carriage 4 which is a movement target. Thus, the carriage 4 can be reliably kept at a predetermined position in the up-down direction.

Therefore, according to this embodiment, the position of the combiner 2, which is the display unit of the display device 1, is stabilized, and the tilting mechanism which can provide a picture or image on the combiner 2 satisfactorily and the display device 1 provided with the same are obtained.

<Modified Example>

Figure 13:
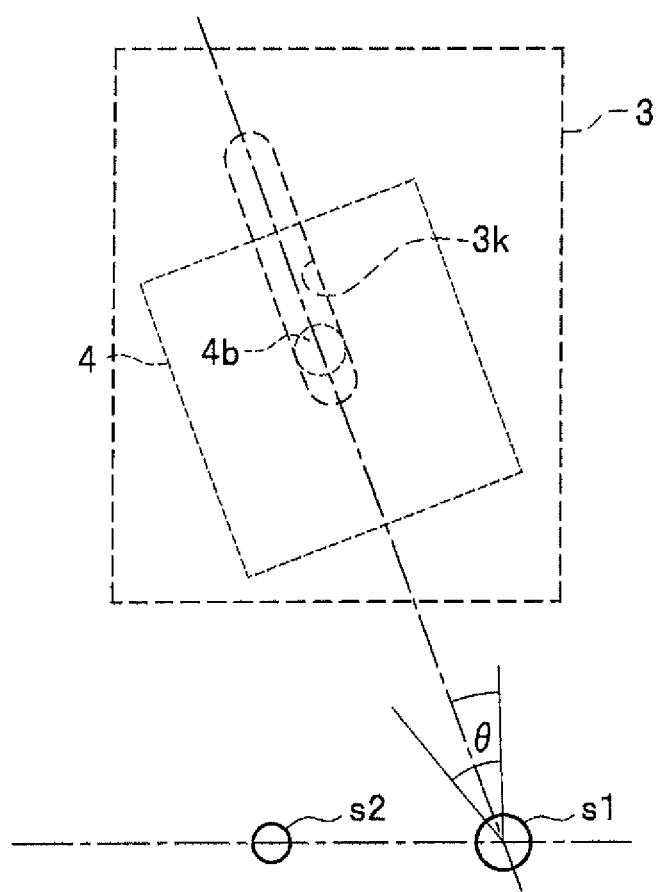
FIG. 13 is a schematic diagram corresponding to FIG. 12 and depicting an arrangement of a pair of slots of a combiner support according to a modified example of the embodiment of the present teaching, wherein a pair of guide bosses of the carriage is fitted into the pair of slots of the combiner support.

FIG. 13 is a schematic diagram corresponding to FIG. 12 and depicting an arrangement of a pair of slots 3k of a combiner support 3 according to a modified example of the embodiment of the present teaching, wherein the pair of guide bosses 4b of the carriage 4 is fitted into the pair of slots 3k of the carriage 3.

As depicted in FIG. 13, the combiner support 3 according to the modified example is formed such that the pair of slots 3*k*, to which the pair of guide bosses 4*b* of the carriage 4 is engaged, is disposed along a neutral position (θ/2) of the angle θ which is a tilt angle of the combiner 2 and the combiner support 3.

With this, the force for tilting the combiner 2 and the combiner support 3 which is to be applied from the guide bosses 4*b* of the carriage 4 to the combiner support 3 can be transmitted from the guide bosses 4*b* of the carriage 4 to the combiner 2 and combiner support 3 most effectively.

<Other Embodiments>

(1) The racks 6*c*, 7*c* and the pinions p1 and p2 in the above embodiment are auxiliary members for keeping the combiner 2 horizontal during the movement of the combiner 2. Thus, any other means or members can be used provided that the combiner 2 can be kept horizontal during the movement of the combiner 2.

(2) Similarly, the left and right torsion springs 5*a*, 5*b* are provided in the second pinion shaft s2 to improve the vibration isolation (vibration control, vibration reduction) of the combiner 2. Specifically, the left cam 9*a* and the right cam 9*b* are brought into contact under pressure with the first pinion shaft s1, which is inserted into the combiner support 3 fixed to the combiner 2, by the left and right torsion springs 5*a*, 5*b*. Thus, the left and right torsion springs 5*a*, 5*b* play a role in supporting the first pinion shaft s1 via the left and right cams 9*a*, 9*b*.

Thus, any other elastic material such as tension springs may be used instead of the left and right torsion springs 5*a*, 5*b*, provided that the first pinion shaft s1 can be supported by being brought into contact under pressure with the left cam 9*a* and the right cam 9*b*. The tension springs can be easily provided in the second pinion shaft s2 without being forgotten.

(3) It is not necessarily indispensable that the shaft guide surface 9*a*3 of the left cam 9*a* and the shaft guide surface 9*b*3 of the right cam 9*b* each have a shape having a curvature (curved surface shape). For example, each of the shaft guide surfaces 9*a*3, 9*b*3 may be a flat surface.

(4) In display device 1, it is allowable to omit one of the left cam 9*a* and right cam 9*b* so as to support the first pinion shaft s1 by single cam. In this case, it is preferable to dispose the single cam such that the single cam contacts the first pinion shaft s1 in the vicinity of the center position, in the left-right direction, of the first pinion shaft s1 Further, it is allowable to omit both of the left cam 9*a* and right cam 9*b*. Note that, when the left cam 9*a* is omitted, the left torsion spring 5*a* is also omitted, and when the right cam 9*b* is omitted, the right torsion spring 5*b* is also omitted. In a case that both of the left cam 9*a* and right cam 9*b* are omitted, a drop or downward shift of the first pinion shaft s1 can be prevented, for example, by using the pinion shaft guide grooves 6*b*, 7*b* designed to restrict a downward movement of shafts.

(5) In display device 1, the first guide rail 6 may not include one or more of the cam guide groove 6*a*, the pinion shaft guide groove 6*b*, the rack 6*c* and the support guide groove 6*d*, and may be a plate member including none of them. Similarly, the second guide rail 7 may not include one or more of the cam guide groove 7*a*, the pinion shaft guide groove 7*b*, the rack 7*c* and the support guide groove 7*d*, and may be a plate member including none of them. In a case that one or more of the above structure of the first and/or second guide rail(s) is/are omitted, other structure(s) may perform the function of the omitted structure(s) instead thereof. For example, the combiner support 3 and the carriage 4 can be guided satisfactorily in the up-down direction by providing two or more guide shafts 4*j* in the left-right direction and/or in the front rear direction. If a protrusion or a groove extending in the axial direction, which engages with the carriage 4, is provided on the guide shaft(s) 4*j*, the combiner support 3 and the carriage 4 can be guided more satisfactorily.

(6) In the above embodiment, the upward straight movements of the first pinion shaft s1 and the combiner support 3 are stopped by bringing the upper end edges (upper ends) 6*b*1, 7*b*1 into contact with the first pinion shaft s1. However, there is no limitation to this. It is allowable to provide a narrow width portions (thin portions) in the pinion shaft guide grooves 6*b*, 7*b*, respectively, and restrict the upward straight movements of the first pinion shaft s1 and the combiner support 3 by the narrow width portions. When the guide rails 6, 7 not including the pinion shaft guide grooves 6*b*, 7*b* are used, the upward movement of the first pinion shaft s1 may be stopped by stop members protruding inwardly from the guide rails 6, 7, respectively. Note that, the guide bosses 4*b* of the carriage 4 and the slot 3*k* of the combiner support 3 are engaged at a position different from a position where the upper end edges (upper ends) 6*b*1, 7*b*1, the narrow width portions, or the stop members are provided, in the horizontal direction perpendicular to the extending direction of the first pinion shaft s1.

(7) The first pinion shaft s1 may be guided by guide grooves different from those of the second pinion shaft s2. For example, the first pinion shaft s1 may be guided by the pinion shaft guide grooves 6*b*, 7*b*, and the second pinion shaft s2 may be guided by guide grooves which are formed between the pinion shaft guide grooves 6*b*, 7*b* and the racks 6*c*, 7*c* to be parallel to the pinion shaft guide grooves 6*b*, 7*b*.

(8) The mechanism for moving the carriage 4 in the up-down direction is not limited to the motor 5, the lead screw 5*n*, and the nut 4*n*. For example, pantograph arm(s) may be used instead of the lead screw 5*n* and the nut 4*n*, and the arm(s) may be driven by a hydraulic drive source or a pneumatic drive source. As another example, a linear-motor actuator may be used. Alternatively, the rotating shaft of the motor 5 and the upper surface of the carriage 4 may be connected by a wire via pulley, and the carriage 4 may be lifted by driving the motor 5.

The combiner 2 related to the above embodiment is an exemplary display plate of the present teaching, the combiner support 3 related to the above embodiment is an exemplary plate support member of the present teaching, the carriage 4 related to the above embodiment is an exemplary conveyance means (conveyance unit) of the present teaching, the nut 4*n* and the lead screw 5*n* related to the above embodiment correspond to an exemplary movement means (movement unit) of the present teaching, and the motor 5 related to the above embodiment is an exemplary drive source of the present teaching. The left torsion spring 5*a* and the right torsion spring 5*b* related to the above embodiment are exemplary elastic bodies of the present teaching, the first and second guide rails 6, 7 related to the above embodiment are exemplary side rail members (guide rails) of the present teaching, and the left cam 9*a* and the right cam 9*b* related to the above embodiment are exemplary guide members (pushing members) of the present teaching. The first pinion shaft s1 related to the above embodiment is an exemplary shaft for tilting (first shaft) of the present teaching, and the second pinion shaft s2 related to the above embodiment is an exemplary shaft for conveyance (second shaft) of the present teaching.

According to the tilting mechanism of the embodiments and the modifications, the plate is moved linearly by linearly moving the conveyance unit together with the plate support member, and the tilting operation of the plate is performed by tilting the plate support member, the tilting of the plate support member being caused by pushing the plate support member by the conveyance unit which moves linearly in a state that the linear movement of the plate support member is stopped. Thus, the plate can be reliably positioned at a predetermined position during the tilting operation of the plate.

According to the tilting mechanism of the embodiments and the modifications, the conveyance unit and the plate support member can be moved along a prescribed path by the side rail member. Further, the tilting mechanism includes the guide member being supported at the shaft for conveyance and configured to contact the shaft for tilting under the condition that the guide member is subjected to the force which makes the guide member approaches the shaft for tilting. Thus, the plate support member into which the shaft for tilting is inserted can be moved while being supported without vibration or with reduced vibration. This enables the stable movement of the plate.

According to the tilting mechanism of the embodiments and the modifications, the shaft for tiling and the shaft for conveyance include the pinion gears and the side rail members include the racks to be engaged with the pinion gears. Thus, the shaft for tilting and the shaft for conveyance can be moved stably.

According to the tilting mechanism of the embodiments and the modifications, the force can be applied to the guide member by the elastic body so that the guide member contacts the shaft for tilting.

According to the tilting mechanism of the embodiments and the modifications, the movement unit includes the screw shaft formed with the male screw and the nut formed with the female screw which is fixed to the conveyance unit and which is engaged with the screw shaft. Thus, the conveyance unit can be moved reliably.

According to the tilting mechanism of the embodiments and the modifications, the movable area of the conveyance unit includes the first area where the conveyance unit and the plate support member are moved linearly and integrally and the second area where the tilting operation of the plate is performed. Thus, the tilting operation can be performed in a state that the plate is positioned at a predetermined position reliably.

According to the tilting mechanism of the embodiments and the modifications, the shaft for tilting and the shaft for conveyance are moved in the first area, the shaft for tilting is stopped and the shaft for conveyance is moved in the second area, and the tilting operation of the plate is performed by using the shaft for tilting stopped as the rotational center. Thus, the tilting operation of the plate can be performed stably, and the plate can be positioned at a predetermined position reliably.

According to the tilting mechanism of the embodiments and the modifications, the operation for moving the display plate linearly and the operation for tilting the display plate are performed independently from each other. Thus, the display plate can be positioned at a predetermined position reliably.

According to the display device of the embodiments and the modifications, the effect of the tilting mechanism of the embodiments and the modifications is obtained.

According to the embodiment and the modifications, it is possible to obtain a tilting mechanism, which positions a display unit stably to provide a picture or image on the display unit satisfactorily, and a display device provided with the same.

The present teaching is not limited to the above embodiment. It is possible to make design changes appropriately without departing from the gist and scope of the present teaching, and it is possible to make various modifications and changes within the scope of the present teaching.

That is, specific embodiments of the present teaching can be arbitrary and appropriately changed without departing from the gist and scope of the present teaching.

The invention claimed is:

1. A tilting mechanism, comprising:
   a drive source configured to drive a plate;
   a movement unit connected to the drive source;
   a conveyance unit configured to be moved linearly by the movement unit; and
   a plate support member to which the plate is fixed and which is partially engaged with the conveyance unit so that the plate support member is moved by the conveyance unit,
   wherein the plate is moved linearly by linearly moving the conveyance unit together with the plate support member; and
   tilting operation of the plate is performed by tilting the plate support member, the tilting of the plate support member being caused by pushing the plate support member by the conveyance unit which moves linearly in a state that the linear movement of the plate support member is stopped,
   the tilting mechanism further comprising:
   a side rail member configured to support a shaft for tilting to guide the shaft for tilting in a movement direction thereof, and configured to support a shaft for conveyance to guide the shaft for conveyance in a movement direction thereof, the shaft for conveyance being inserted into the conveyance unit, the shaft for tilting being inserted into the plate support member; and
   a guide member being supported at the shaft for conveyance and configured to contact the shaft for tilting under a condition that the guide member is subjected to force which makes the guide member approaches the shaft for tilting.

2. The tilting mechanism according to claim 1, wherein the side rail member includes first side rail member and second side rail member, first side rail member being arranged at one side of the conveyance unit along the shaft for conveyance, second side rail member being arranged at the other side of the conveyance unit along the shaft for conveyance;
   first pinion gears are attached to the shaft for tilting;
   second pinion gears are attached to the shaft for conveyance; and
   each of first and second side rail members includes rack to be engaged with the first and second pinion gears.

3. The tilting mechanism according to claim 1, further comprising an elastic body configured to bias or urge the guide member against the shaft for tilting so that the guide member contacts the shaft for tilting.

4. The tilting mechanism according to claim 3, wherein the guide member includes first guide member which is supported by the shaft for conveyance at one side of the conveyance unit and second guide member which is supported by the shaft for conveyance at the other side of the conveyance unit; and
   the elastic body includes first elastic body configured to bias or urge the first guide member and second elastic body configured to bias or urge the second guide member.

5. The tilting mechanism according to claim 1, wherein the movement unit comprises: a screw shaft formed with a male screw; and a nut formed with a female screw which is fixed to the conveyance unit and which is engaged with the screw shaft.

6. The tilting mechanism according to claim 1, wherein a movable area of the conveyance unit includes a first area where the conveyance unit and the plate support member are moved linearly and integrally and a second area where the tilting operation of the plate is performed.

7. The tilting mechanism according to claim 1, wherein a movement area of the conveyance unit includes a first area where the conveyance unit and the plate support member are moved linearly and integrally and a second area where the tilting operation of the plate is performed;
the shaft for tilting and the shaft for conveyance are moved in the first area;
the shaft for tilting is stopped and the shaft for conveyance is moved in the second area; and
the tilting operation of the plate is performed by using the shaft for tilting stopped as a rotational center.

8. The tilting mechanism according to claim 1, wherein the plate is a display plate on which information is displayed.

9. A display device comprising the tilting mechanism as defined in claim 1.

10. A tilting mechanism configured to move a display plate in an up-down direction and to tilt the display plate under a condition that upward movement of the display plate is completed, the tilting mechanism comprising:
a plate support member configured to support the display plate;
a first shaft extending in a horizontal direction while being rotatably supported by the plate support member;
a conveyance unit which is engaged with the plate support member in a state that the plate support member is rotatable relative to the conveyance unit; and
stopper configured to constrain upward movement of the first shaft,
wherein the display plate is tilted with the first shaft as a pivot by moving the conveyance unit upwardly in a state that the first shaft is brought into contact with the stopper,
the tilting mechanism further comprising:
a side rail member configured to support the first shaft to guide the first shaft in a movement direction thereof, and configured to support a second shaft to guide the second shaft in a movement direction thereof, the second shaft being inserted into the conveyance unit, the first shaft being inserted into the plate support member; and
a guide member being supported at the second shaft and configured to contact the first shaft under a condition that the guide member is subjected to force which makes the guide member approaches the first shaft.

11. The tilting mechanism according to claim 10, wherein the side rail member includes first and second side rail members each provided with guide groove to guide the first shaft in the up-down direction, and
wherein the stopper includes upper end edge of each guide groove.

12. The tilting mechanism according to claim 10,
wherein the second shaft extends in the horizontal direction while being rotatably supported by the conveyance unit; and
the guide member includes first and second guide members attached to the second shaft and configured to be biased or urged toward the first shaft so that the first and second guide members are brought into contact under pressure with the first shaft from below.

13. The tilting mechanism according to claim 12, wherein the display plate is tilted in a state that the movement of the first shaft in the up-down direction is constrained by the first and second guide members, and the stoppers or the upper end edges.

* * * * *